United States Patent [19]

Aripze-Gilmore

[11] Patent Number: 4,886,229
[45] Date of Patent: Dec. 12, 1989

[54] HUNTING SEAT

[76] Inventor: Roberto Aripze-Gilmore, C.P. 66290, Garza Garcia, N.L., Mexico

[21] Appl. No.: 238,000

[22] Filed: Aug. 29, 1988

[30] Foreign Application Priority Data

Sep. 7, 1987 [MX] Mexico ................................ 8124

[51] Int. Cl.⁴ .......................................... F16M 11/38
[52] U.S. Cl. .................................... 248/125; 248/164; 248/166; 297/188
[58] Field of Search ............... 248/164, 125, 188, 166, 248/118, 118.3; 297/188, 117

[56] References Cited

U.S. PATENT DOCUMENTS

| | | | |
|---|---|---|---|
| 2,561,046 | 7/1951 | Brooks | 248/125 X |
| 2,630,288 | 3/1953 | Eubanks, Sr. | 248/125 X |
| 2,954,955 | 10/1960 | Feller | 297/188 X |
| 3,667,773 | 6/1972 | Hess | 297/188 X |
| 4,029,318 | 6/1977 | Boss | 248/164 X |
| 4,500,134 | 2/1985 | Kameko et al. | 297/188 X |
| 4,645,167 | 2/1987 | Hardwick | 297/188 X |

Primary Examiner—Alvin C. Chin-Shue
Attorney, Agent, or Firm—Abelman, Frayne, Rezac & Schwab

[57] ABSTRACT

A weapon support device for a hunting seat preferably of the pliable type, comprising support means articulately coupled to said hunting seat so as to be folded when folding the stand and comprising a retaining portion to be fastened to the hunting seat and a top support portion; variable height weapon retaining means coupled to the top support portion of the support means, adapted to support and/or hold the weapon at an adjustable height without the need of a hunter to grasp it and to rotate the weapon therein to stalk and hunt game; and fastening means for rigidly grasping the support means when the seat is assembled.

7 Claims, 4 Drawing Sheets

HUNTING SEAT

BACKGROUND OF THE INVENTION

1. Field of the Invention

This invention is related with a hunting seat and more particularly with a weapon support device for a hunting stand so as to support and/or hold a weapon, which can be foldable with a foldable hunting seat when it is carried away.

2. Description of the Previous Art

It has been widely increased in the scientific, sport or professional hunting, the use of devices which allow the hunter to be more comfortable and to have more precision.

Nevertheless, a series of light hunting devices which can be folded, stored and easily carried away has been adopted to keep the hunter from carrying it with heavy and annoying equipment.

Fork poles which can be driven into the ground are known as well, wherein such fork poles can be used so as to utilize its branched end as a support aid for the weapon of the hunter.

Such devices have the disadvantage of being more or less foreshortened to avoid annoyance for transportation, impeding its height adjustment and rotation to pursue a seizure, being a week support for the weapon and demanding continuous retaining by the hunter.

To overcome such drawbacks it was created the hunting tripod, which is a variation of the fork pole but having three legs which serve as independent support, this resulted in an increment in weight and things to carry with.

By means of the weapon support device for a hunting stand, of the present invention, all of the disadvantages of the prior art are overcome because of a foldable support assembly having variable height weapon retaining means to support and/or hold the weapon, which is adapted to support and/or hold the weapon at an adjustable height without the need of a hunter to grasp it and to rotate the weapon therein to pursue a seizure.

SUMMARY OF THE INVENTION

It is therefore a main object of the present invention, to provide a weapon support device for a hunting stand adapted to support and/or hold a weapon while the hunter is waiting for a seizure and to rotate said weapon in said device when pursue a seizure.

It is still another main object of the present invention to provide weapon support device for a hunting seat which is of variable height to be adjustable to the hunter needs.

It is a further main object of the present invention to provide a weapon support device for a hunting seat which allows to fasten a weapon without the need that the hunter to grasp his weapon all the time while waiting for a seizure.

It is still another main object of the present invention to provide a weapon support device for a foldable hunting seat which can be folded when folding the seat and which provides a steady support which allows a weapon to rest without the need for the hunter to grasp it and be rotated when stalking and hunting game.

These and other objects and advantages of the invention will be apparent to those skilled in the art from the description of a preferred embodiment provided in combination with the accompanying drawings.

DETAILED DESCRIPTION OF THE INVENTION

Figure 1:
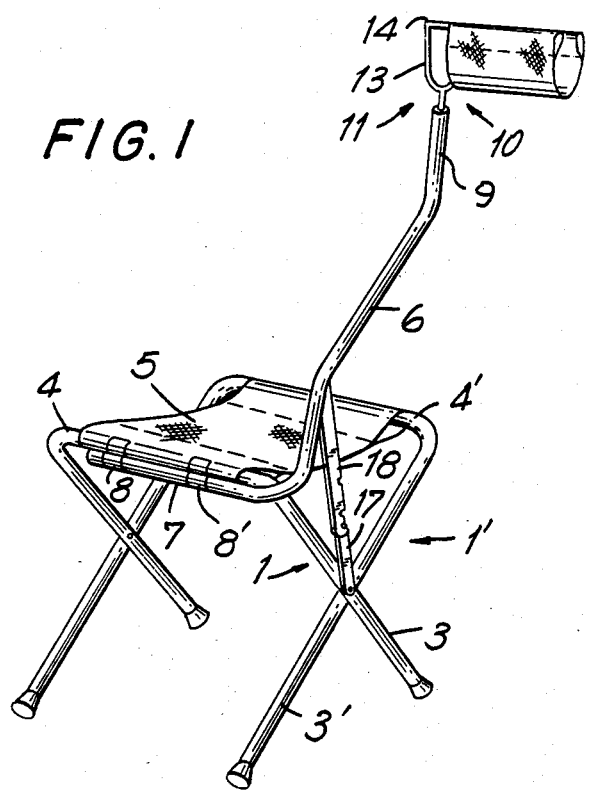
FIG. 1 is a conventional perspective view of an embodiment of the weapon support device of the present invention, adapted for a foldable hunting seat, showing its constitutive parts.
Figure 2:
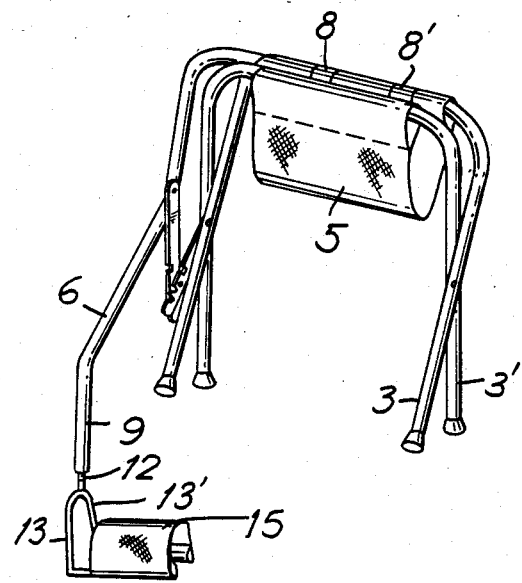
FIG. 2 is a conventional perspective view of the foldable hunting seat of FIG. 1, incorporating the weapon support device, in a folded position.
Figure 3:
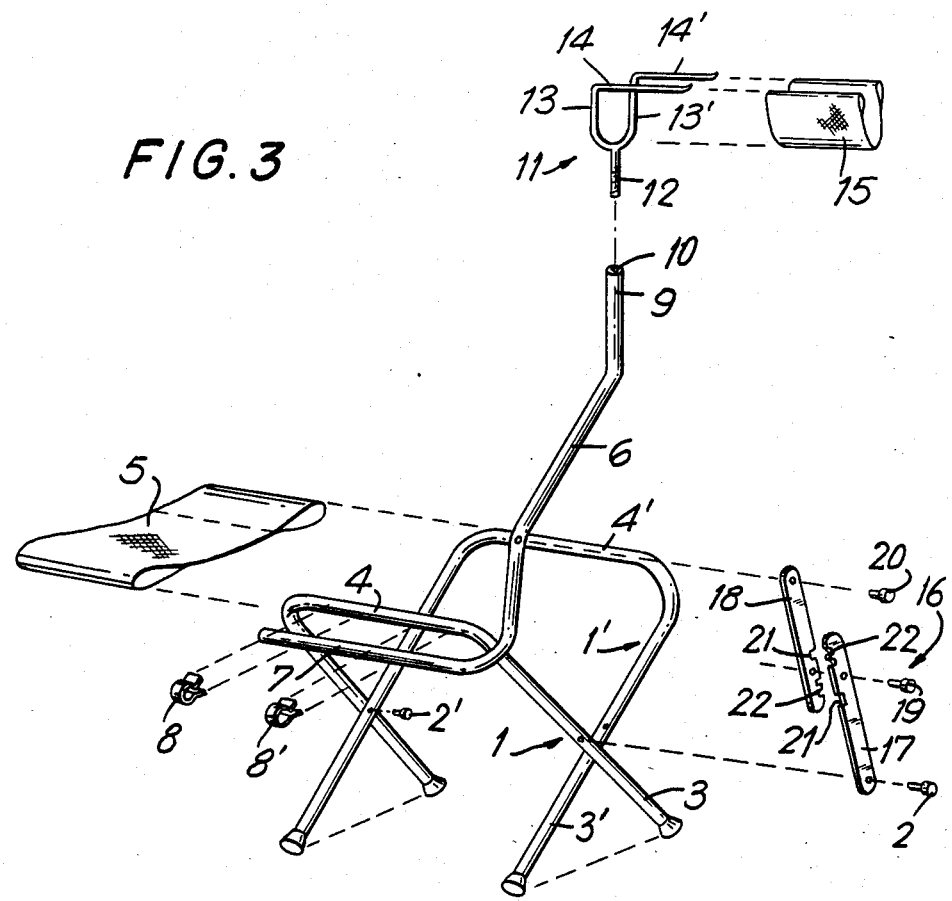
FIG. 3 is an schematic view in which the weapon support device and the hunting stand of FIG. 1 have been separated in their parts.

Referring to the accompanying drawings, it will be described a preferred embodiment of the invention wherein same numerals describe same features of the invention.

A first embodiment of a conventional pliable hunting seat illustrated as a foldable, scissor type bench, comprising a pair of tubular members 1,1' in the form of an inverted "U", coupled by its middle portion of their vertical branches by means of pins 2,2' so as to be folded as a scissor, presenting two pairs of lower supporting legs 3,3' and two upper fastening edges 4,4', a seat 5 made of canvas or any other flexible and resistant material is grasped to the fastening edges 4,4' of said tubular members 1,1'.

The weapon support device, of the present invention, for said hunting seat, comprises support means such as a support arm 6 having a lower end 7 horizontally bent and articulately fastened to the fastening edge 4 of the tubular member 1 by means of a pair of grasping clamps 8,8' in such a way that it can be folded when plying the seat, and an upper vertical end 9 having a nut 10 on its top; variable height weapon retaining means 11 comprising a fork 12 having its vertical lower end threaded to be screwed in the nut 10 of the top of said upper vertical end 9 of the support arm 6, and a pair of branched arms 13, 13' each having an horizontal member 14,14' to retain a cot 15 made of a flexible and resistant material, grasped therebetween, so as to retain and/or hold a weapon when the hunter is stalking game, the height of said weapon support means 11 can be adjusted by screwing or unscrewing the fork 12 in said nut 10 of the support arm 6, allowing simultaneously to rotate the weapon in said weapon support means 11 when pursuing a seizure; and fastening means 16 for the weapon support means 11, articulately fastened to one of the legs 3 of the hunting stand so as to allow said weapon support means 11 to be firmly retained when the hunting seat is in its assembled position and folded when folding the seat, and comprising a pair of rods 17,18 articulately coupled to each other through one of their ends by means of a pin 19 and secured to a leg 3 of the seat and to a portion of the upper vertical end 9 of the support arm 6 by means of pins 2 and 20, respectively, and having lock recesses 21 and stops 22 so as to allow retention of said support arm 6 when is in a ready position and be plied when folding the seat.

Figure 4:
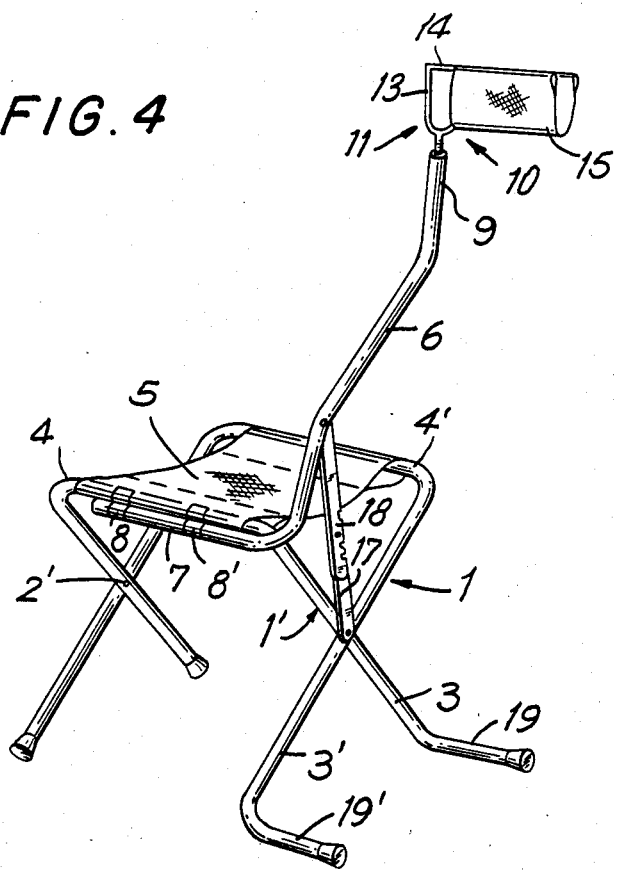
FIG. 4 is a conventional perspective view of another embodiment for the foldable hunting stand incorporating the weapon support device of the present invention.

In order to impart stability to the foldable hunting seat incorporating the weapon support device of the present invention, each of the lower ends of the legs 3,3' of the seat can include a horizontal bent portion 19, 19' vest that the seat could fall when supporting a heavy weapon, as illustrated in FIG. 4.

Figure 5:
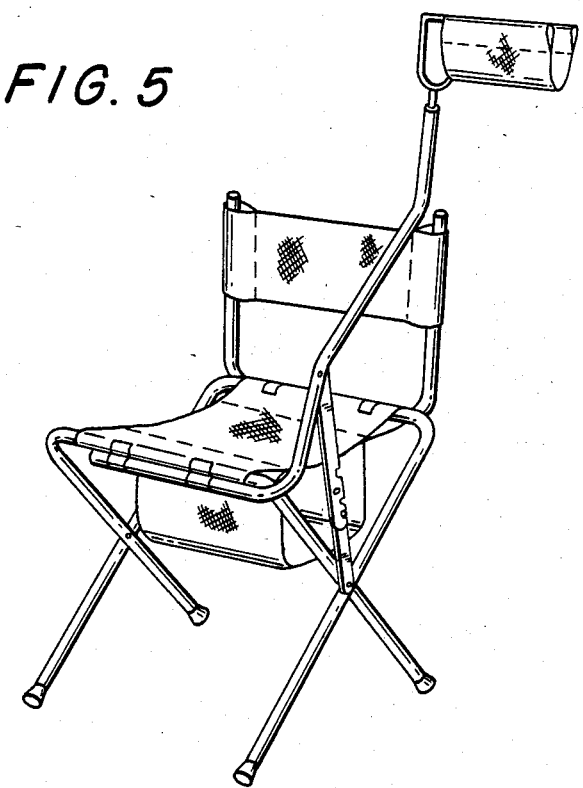
FIGS. 5 and 6 are conventional perspective views of further embodiments for the foldable hunting stand incorporating the weapon support device of the present invention.
Figure 6:
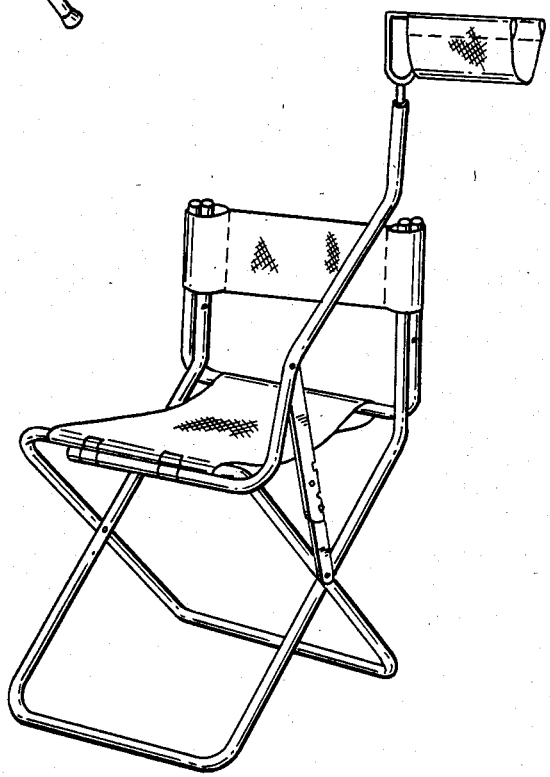

Other embodiments of said foldable hunting seat are possible, such as those illustrated in the self explainable FIGS. 5 and 6, including a back for the hunter.

Furthermore, said support means 6 and variable height weapon retaining means 11 can be designed in any other suitable way but maintaining the possibility to be folded when folding the seat and to be of a variable height, such as a foldable tripod assembly for said support means, and a telescopic assembly for said variable height weapon retaining means type. Horizontal members 14, 14' and cot 15 can also be substituted by any type of clamp so as to allow to retain a weapon.

Similarly, the persons skilled in the art may suggest any other suitable type of fastening means 16 for the weapon retaining means 11, which, in combination with the present invention will be within the scope thereof.

Therefore it should be understood that the hunting seat as well as the weapon support device of the present invention could be made in any other type and be foldable in any other form in order to reach the objectives and advantages of the present invention as herein above has been described. Therefore, the present invention should be limited only by the scope of the following claims.

What is claimed is:

1. A foldable hunting seat comprising: two pairs of legs supporting respective first and second fastening edges, articulately coupled to each other and a seat grasped to the fastening edges, so as to be folded, a weapon support arm having a lower horizontal portion articulately coupled to the first of the fastening edges of the foldable seat, so as to be folded when the seat is folded, an upper vertical portion having a receptacle therein, a weapon holding rest comprising a fork provided with a lower vertical member to be rotatively coupled to the receptacle to the upper portion of the weapon support arm in a manner which allows to adjust its height, and two upper branches each of which having a horizontal member and a cot of flexible material fastened therebetween, to support and allow horizontal rotation of a weapon when stalk-hunting game, and a foldable fastening linkage having two ends, one end coupled to a leg of said foldable hunting seat and a second end coupled to the vertical portion of said weapon support arm, so as to retain the weapon support arm in a rigid position when stalk-hunting game and to be folded when the seat and the arm are folded.

2. A foldable hunting seat as claimed in claim 1, wherein the weapon support arm comprise a tubular arm which is bent at its lower end into a lower horizontal retaining portion which is articulately fastened to said foldable hunting seat and an upper vertical top support portion having a coupling receptacle therein in which said weapon holding rest is adjustably coupled.

3. A foldable hunting seat, as claimed in claim 1, wherein the variable height weapon holding rest comprises a "Y" fork having a vertical lower member including coupling means to be coupled in the upper vertical portion of said weapon support arm and two upper branches each of which having a horizontal member and a cot of flexible material fastened between said horizontal members so as to retain a weapon without the need to be grasped.

4. A foldable hunting seat, as claimed in claim 3, wherein the coupling means of the upper vertical portion and of said vertical lower member of the "Y" fork of the variable height weapon holding rest are correspondingly a nut and screw so as to allow the variable height weapon holding rest to be rotated and to adjust its height relative to the tubular 5. A foldable hunting seat, as claimed in claim 3, wherein the coupling means of said upper vertical portion and of said lower member of the "Y" fork of the variable height weapon retaining means are correspondingly a telescopic type assembly to rotate and adjust the height therebetween.

6. A foldable hunting seat, as claimed in claim 2, wherein the variable height weapon holding rest comprise a "Y" fork having a vertical member to be coupled in the top support portion of said tubular arm and two upper branches having a clamp therebetween to hold the weapon.

7. A foldable hunting seat, as claimed in claim 1, wherein the foldable fastening linkage for the support arm comprises a pair of rods articulately coupled to each other and secured to the hunting stand and to the support arm, each having lock recesses and stops so as to allow a steady retention of said support arm when it is in an assembled position and be folded when folding the hunting seat.

* * * * *